United States Patent [19]
Tyau

[11] 3,889,200
[45] June 10, 1975

[54] TRIGGER CIRCUIT FOR BALL PROVER OR THE LIKE

[75] Inventor: Walter Fah Min Tyau, Orange, Calif.

[73] Assignee: International Telephone and Telegraph Corporation, New York, N.Y.

[22] Filed: Jan. 21, 1974

[21] Appl. No.: 435,258

Related U.S. Application Data

[62] Division of Ser. No. 304,997, Nov. 9, 1972, Pat. No. 3,832,883.

[52] U.S. Cl. ............ 328/163; 307/246; 307/247 A; 307/290; 328/147
[51] Int. Cl. .......................... H03b 1/00; H03k 5/00
[58] Field of Search ....... 307/237, 247 A, 290, 292, 307/246; 328/162-164, 147

[56] References Cited
UNITED STATES PATENTS

| | | | |
|---|---|---|---|
| 3,428,830 | 2/1969 | McEvoy | 307/247 A |
| 3,461,404 | 8/1969 | Kutschbach | 307/290 |
| 3,597,629 | 8/1971 | Bartlett | 307/247 A |
| 3,656,003 | 4/1972 | Chen et al. | 307/237 |

Primary Examiner—Stanley D. Miller, Jr.
Attorney, Agent, or Firm—A. Donald Stolzy

[57] ABSTRACT

A trigger circuit including first and second input leads, wherein two switches are connected in parallel between the leads. A regenerative amplifier is connected from the leads. The first lead is connected to a first junction. A D.C. source of potential and a first resistor are provided, as well. The first resistor is connected from the first junction to the source. A second junction and a second resistor are also provided. The second resistor is connected from the source to the second junction. The second lead is connected to a point of reference potential. A third resistor is connected from the third junction to the point. A regenerative amplifier includes a differential amplifier having inverting and noninverting inputs and an output. A positive feedback resistor is connected between the noninverting input and the output. The second junction is connected to the noninverting input. Means are provided that connect the first junction to the inverting input. The regenerative amplifier has hysteresis which prevent a double pulse output in the event of a double pulse input. That is, only one pulse out is allowed even though two short and closely spaced pulses are provided at the input of the regenerative amplifier. This arrangement prevents inaccurate pulse counting in a ball prover or the like.

2 Claims, 1 Drawing Figure

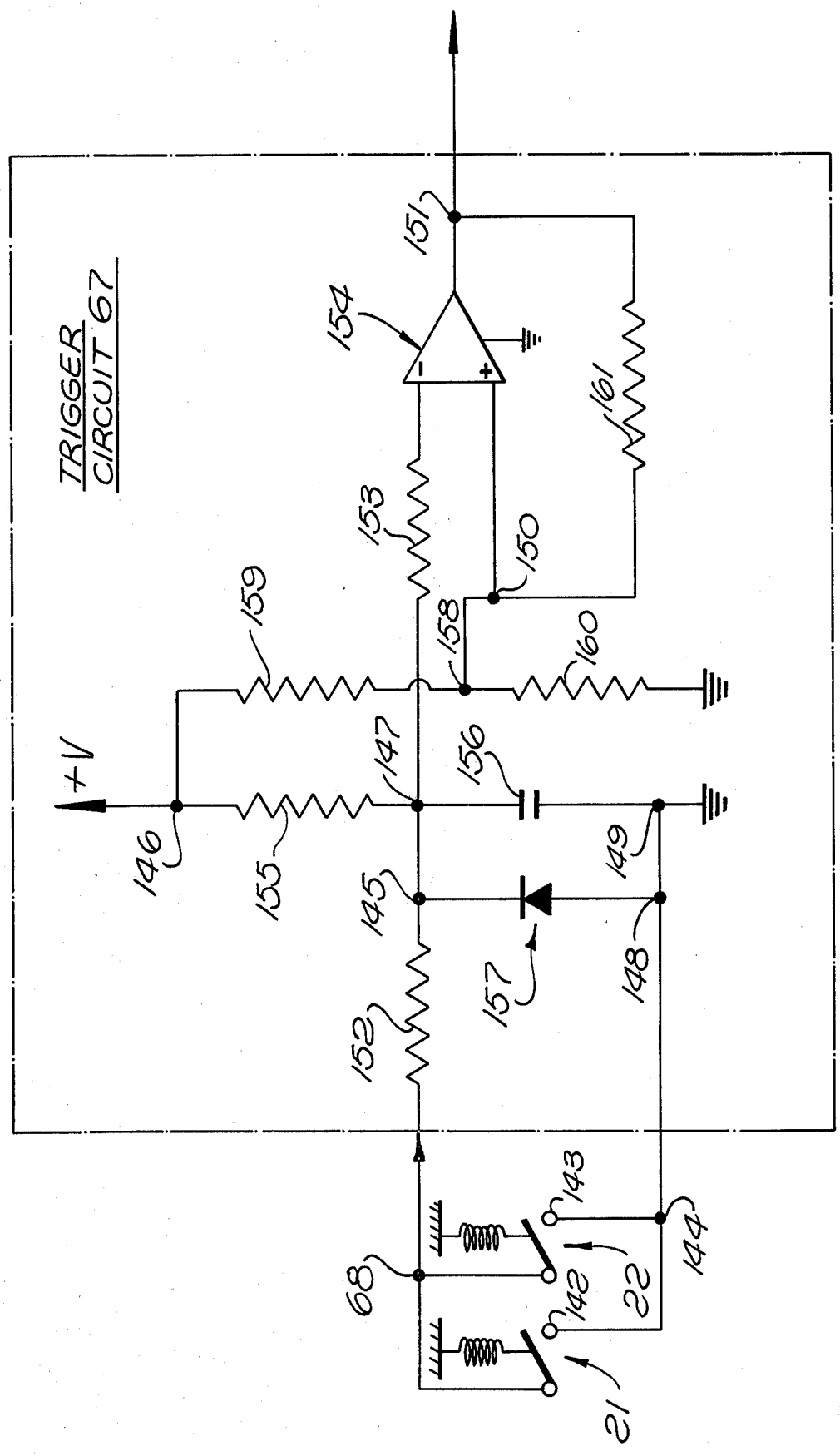

TRIGGER CIRCUIT FOR BALL PROVER OR THE LIKE

This application is a division of copending application Ser. No. 304,997 filed Nov. 9, 1972, now Pat. No. 3,832,883 of the same title and inventor as this application. The benefit of the filing date of said copending application is, therefore, hereby claimed for this application.

BACKGROUND OF THE INVENTION

This invention relates to test equipment and components thereof, and more particularly, to a trigger circuit for a ball prover or the like.

In the past it has been the practice to test the accuracy of flowmeters, which flowmeters produce pulses at a pulse repetition frequency (PRF) directly proportional to the volume rate of fluid flow, by connecting them in series with the pipeline section of a ball prover. A section of a ball prover pipeline has two axially spaced, normally open momentary contact switches therein. The pulse output of the flowmeter under test is then counted during the time interval between the successive closures of the respective switches. The switches are actuated by the movement of a spherical ball in the prover pipeline. The ball has a diameter only slightly less than the inside diameter of the pipeline section so as to roll freely therein without allowing substantial fluid leakage therearound. The counted output pulses of the flowmeter under test are then recorded for several different flow rates to determine if there is any nonlinearity. For a flowmeter with prefect linearity, the counted pulses for several test runs may be exactly the same or may not vary more than one pulse or a few pulses.

Prior art ball provers suffer from at least one serious disadvantage. The switches each have a pair of contacts that are mutually engaged or separate more than once when they are actuated. That is, they are conventional switches that may have, for example, bias springs and/or cantilever leaf springs to carry the contacts. The material of the contacts themselves are resilient as are the leaf or bias springs. Due to these factors alone and/or other factors, the contacts, therefore, bounce. The bouncing contacts then cause multiple pulse inputs to be provided to the ball prover circuit. These multiple pulse inputs create errors in the timing interval during which the flowmeter output pulses are counted. The ball prover then fails to perform its only function, i.e., to determine the accuracy of the flowmeter under test.

SUMMARY OF THE INVENTION

In accordance with the present invention, the above-described and other disadvantages of the prior art are overcome by the use of a trigger circuit.

The above-described and other advantages of the present invention will be better understood from the following detailed description when considered in connection with the accompanying drawings.

BRIEF DESCRIPTION OF THE DRAWING

The only FIGURE is a schematic diagram of the trigger circuit of the present invention.

DESCRIPTION OF THE PREFERRED EMBODIMENT

In the drawing, a small portion of a ball prover is indicated.

Momentary contact switches 21 and 22 are positioned, for example, at the same circumferential point around the interior of a pipeline section, but are spaced axially from each other.

Switches 21 and 22 are entirely conventional. Further, switch 22 may be identical to switch 21. Both of the switches 21 and 22 may be fluid tight switches.

SWitch 21 is normally open, momentary contact switch.

Note will be taken that the axial spacing of switches 21 and 22 is invariant. Thus, if the flow rate through the pipeline section is constant while the ball is rolling, the time interval between the closure of switches 21 and 22 will be directly proportional to the rate of fluid flow through the pipeline section. For these reasons, the ball prover may be employed to test the accuracy and linearity of a flowmeter.

Note will be taken that, switches 21 and 22 are connected in parallel with each other from a junction 68 to ground at 69. The input to a trigger circuit 67 is connected from junction 68.

As shown, switches 21 and 22 have contacts 142 and 143, both of which are connected to a junction 144.

Trigger circuit 67 has various junctions at 145, 146, 147, 148, 149, 150 and 151. Junctions 144, 148 and 149 are all grounded at 69. A resistor 152 is connected between junctions 68 and 145, junctions 145 and 147 being connected together. A resistor 153 is connected from junction 147 to the inverting input of a differential amplifier 154. A resistor 155 is connected between junctions 146 and 147. A capacitor 156 is connected between junctions 147 and 149. Junction 146 is maintained at potential +V. A diode 157 is connected between junctions 145 and 148, and poled to be conductive in a direction toward junction 145.

Another junction 158 is provided. A resistor 159 is connected between junctions 146 and 158. Another resistor 160 is connected from junction 158 to ground, junctions 150 and 158 being connected together and to the noninverting input of differential amplifier 154. A feedback resistor 161 is connected between junctions 150 and 151, junction 151 also being connected from the output of amplifier 154.

OPERATION

In the operation of the system of the present invention, responsive to the successive actuations of switches 21 and 22, a positive pulse or gate is produced at the output of amplifier 154, the leading and trailing edges of which coincide with the momentary actuation of switches 21 and 22.

In operation, capacitor 156 charges to +V through resistor 155. Pulses are generated by momentary contact switches 21 and 22. This is true because capacitor 156 is, by the closure of either one of the switches 21 and 22, discharged through resistor 152.

The resistance of resistor 155 is larger than the resistance of resistor 152. For example, the resistance of resistor 155 may be 5,100 ohms, whereas the resistance of resistor 152 may be 82 ohms. This provides an outstanding advantage of the invention because, due to the resilience of any springs connected to switches 21 and 22, or due to the resilience of any cantilever springs carrying the spring contacts, or due to the resilience of the contacts themselves because of their bulk and/or compression moduli of elasticity, the contacts of switches 21 and 22 tend to bounce. It is highly critical to the present invention that amplifier 154 produce only one output pulse on the closure of each switch 21 and 22. By employing the higher resistance of resistor 155, the charging rate of capacitor 156 is kept low once capacitor 156 has been discharged by a single closure of one of the switches 21 and 22. By keeping the charging rate of capacitor 156 low, any further discharge caused by contacts bouncing will produce a pulse at junction 147 connected to the inverting input of amplifier 154 which is of an amplitude so low that it will not appear in the output of amplifier 154. That is, any small conventional threshold bias may be set in trigger circuit 67, to suppress any small amplitude pulses produced by contact bounce. Such bias already exist and may either partially or completely suppress such small amplitude pulses.

The foregoing description of the pulse discrimination function of some of the circuit elements of trigger circuit 67 is related to the possibility of contact bounce causing effectively a reclosure of, for example, switch 21 after the switch has already closed once and opened once in succession in that order.

The following is a description of a regenerative ammplifier in circuit 67 which has a relatively large hysteresis. This regenerative amplifier acts as a pulse discriminator when, for example, switch 21 closes and then subsequently reopens.

Note that if capacitor 156 is fully charged and switch 21 first closes for a very short time and then reopens, the output of amplifier 154 might show a trailing edge of a pulse if the potential of junction 147 rises high enough after the said reopening. This is prevented by the regenerative amplifier including amplifier 154 and the positive feedback resistor 161 which is connected from the output of the noninverting input of amplifier 154.

It has been discovered in connection with the present invention that the said regenerative amplifier has a substantial and ample hysteresis. For example, junction 151 may have a potential which jumps to its highest level when the potential of junction 147 falls below 1.1 volts and which jumps to its lowest level when the potential of junction 147 rises above 2.7 volts. A hysteresis of 1.5 or 1.6 volts is thus substantial and ample.

The following circuit values are typical, but not critical:

| | |
|---|---|
| Capacitor 156 | 3.3 Microfarad |
| Diode 157 | SD1 |
| Potential+V | 5.0 Volts |
| Resistor 152 | 82 Ohms |
| Resistor 153 | 4,660 Ohms |
| Resistor 155 | 5,100 Ohms |
| Resistor 159 | 3,740 Ohms |
| Resistor 160 | 3,740 Ohms |
| Resistor 161 | 10,000 Ohms |
| Resistor 164 | 3,300 Ohms |
| Resistor 165 | 1,000 Ohms |
| Resistor 170 | 2,000 Ohms |
| Resistor 191 | 5,100 Ohms |
| Resistor 192 | 5,100 Ohms |
| Resistor 196 | 1,000 Ohms |

As used herein and the claims, the word "resistor" as employed to describe either resistor 152 or resistor 153 is hereby defined to include either a resistor of a resistance of less than, equal to or greater than 5,000 ohms or simply a conductive lead or other conductor because the resistance of either resistor 152 or resistor 153 may be quite low in some applications.

The word "connected" in any of its grammatical forms is hereby defined for use herein and in the claims to include, but not be limited to, connection by a conductive lead, a resistor or other circuit element, or by a stage or otherwise.

What is claimed is:

1. A trigger circuit comprising: first and second input leads; two switches connected in parallel between said leads; and a regenerative amplifier connected from said leads, said first lead being connected to a first junction, a D. C. source of potential, a first resistor connected from said first junction to said source, a second junction, a second resistor connected from said source to said second junction, said second lead being connected to a point of reference potential, a third resistor connected from said second junctionn to said point of reference potential, said regenerative amplifier including a differential amplifier having inverting and noninverting inputs and an output, a fourth positive feedback resistor connected between said noninverting input and said output, said second junction being connected to said noninverting input, and means connecting said first junction to said inverting input.

2. The invention as defined in claim 1, wherein said means includes a resistor.

* * * * *